(12) United States Patent
Sato

(10) Patent No.: US 9,027,417 B2
(45) Date of Patent: May 12, 2015

(54) FORCE SENSOR AND ROBOT ARM INCLUDING FORCE SENSOR

(71) Applicant: Canon Kabushiki Kaisha, Tokyo (JP)

(72) Inventor: Shuuichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/927,488

(22) Filed: Jun. 26, 2013

(65) Prior Publication Data

US 2014/0000388 A1 Jan. 2, 2014

(30) Foreign Application Priority Data

Jun. 29, 2012 (JP) ................................. 2012-147149

(51) Int. Cl.
*G01L 1/04* (2006.01)
*G01L 5/22* (2006.01)
*G01L 5/16* (2006.01)

(52) U.S. Cl.
CPC . *G01L 1/04* (2013.01); *G01L 5/226* (2013.01); *G01L 5/164* (2013.01)
USPC .................................................. 73/862.642

(58) Field of Classification Search
USPC ...................................... 73/862.642, 862.462
See application file for complete search history.

(56) References Cited

U.S. PATENT DOCUMENTS

| | | | | |
|---|---|---|---|---|
| 3,713,336 A * | 1/1973 | Bernstein et al. | .......... | 73/170.11 |
| 2010/0175487 A1* | 7/2010 | Sato | .......... | 73/862.69 |

FOREIGN PATENT DOCUMENTS

| | | |
|---|---|---|
| CN | 2710848 Y | 7/2005 |
| CN | 201281640 Y | 7/2009 |
| CN | 101598613 A | 12/2009 |
| CN | 101779110 A | 7/2010 |
| CN | 102151179 A | 8/2011 |
| CN | 102166755 A | 8/2011 |
| JP | 06-310250 A | 11/1994 |
| JP | 2009-075083 A | 4/2009 |

* cited by examiner

*Primary Examiner* — Lisa Caputo
*Assistant Examiner* — Octavia Hollington
(74) *Attorney, Agent, or Firm* — Canon U.S.A., Inc. IP Division

(57) ABSTRACT

A force sensor that detects external force includes a sheath, a pressure member configured to be provided on the sheath, a sensor unit configured to detect force applied to the pressure member, and a slip ring unit configured to supply power or transmit signals through a contact between a brush and a ring. The sensor unit and the slip ring unit are stored in the sheath, and power is supplied or signals are transmitted between the slip ring unit and the sensor unit.

11 Claims, 10 Drawing Sheets

FIXED ELECTROMAGNETIC TRANSDUCER

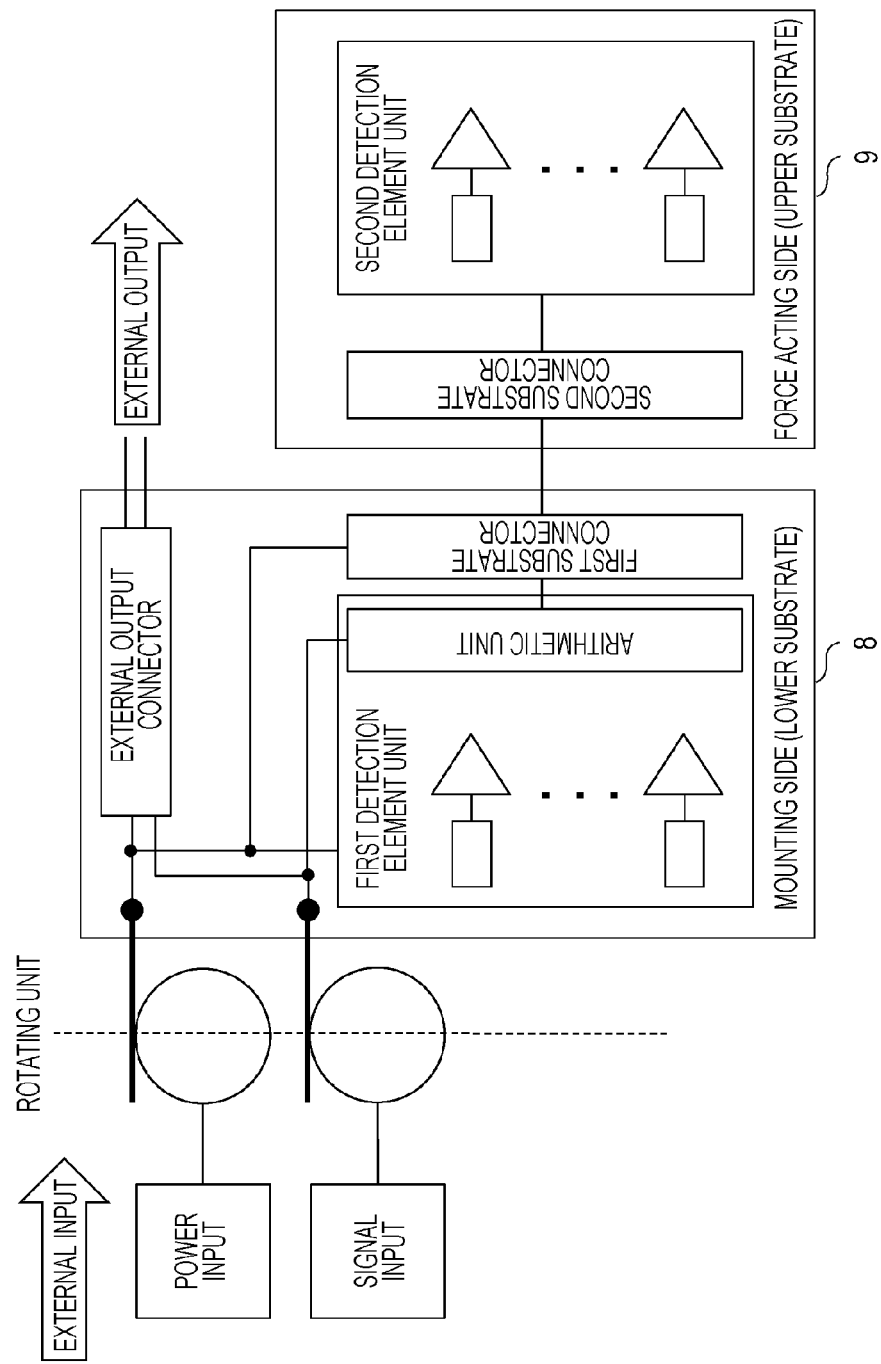

FORCE SENSOR AND ROBOT ARM INCLUDING FORCE SENSOR

BACKGROUND OF THE INVENTION

1. Field of the Invention

The present invention relates to a force sensor that detects external force and a robot arm including the force sensor.

2. Description of the Related Art

In these years, as robotics develops, there is a growing trend toward use of vertical articulated robots that automatically operate in accordance with control programs for manufacture of products. In order to manufacture products for which precise assembly operations are required, a robot including a force sensor has been proposed whose robot arm includes, at a position corresponding to a wrist portion of the robot arm, a force sensor for detecting external force and that is capable of performing precise assembly operations while detecting external force applied to a robot hand connected to the robot arm.

As the force sensor for detecting external force, a force sensor of a magnetic type is known (Japanese Patent Laid-Open No. 2009-75083). The force sensor of a magnetic type has a structure in which magnetic flux generating sources and magnetoelectric transducers are held in such a way as to be able to move relative to each other. The output voltages of the magnetic flux generating sources change in accordance with the magnetic flux density of magnetic flux flowing to the magnetoelectric transducers, which changes in accordance with a distance between the magnetic flux generating sources and the magnetoelectric transducers that may be changed by external force. By detecting the output voltages, the magnitude of the external force may be detected.

On the other hand, a device called a "slip ring" that is capable of transmitting electric power and electrical signals from a stationary body to a rotating body is known (Japanese Patent Laid-Open No. 06-310250). The slip ring is used when electric power and data signals are to be transmitted in an electromechanical system that needs to intermittently or continuously rotate. By providing the slip ring at a rotating unit instead of providing a transmission cable that is easily broken due to metal fatigue caused by bending at the rotating unit, the performance of the system improves and the operation of the system may be simplified. In the case of a robot, wires that are easily broken at movable joints may be omitted. The slip ring is also called a "rotary electrical joint" or a "collector", but will be simply referred to as the slip ring hereinafter. Although apparatuses capable of transmitting electric power and electrical signals from a stationary body to a rotating body include a rotary connector that utilizes conducting fluid, the rotary connector will also be referred to as the "slip ring" in the following description. Members that rotate relative to each other such as a brush and rings in the slip ring may be referred to as a stationary body and a rotating body for the sake of convenience.

A robot is normally fixed to a base. A fixed end of the robot is configured by a thick, large member because the fixed end of the robot needs to be firmly fixed physically. On the other hand, compared to the fixed end, an arm of the robot (robot arm) is designed to become thinner and thinner on the side of a free end, so that a wide movable range is secured and various attitudes necessary to perform operations are established while avoiding collisions. Therefore, at positions close to the free end of the robot arm, there are limitations in design, that is, the area of regions other than links and joint portions of the robot arm in which additional components may be mounted is small.

When a slip ring is to be mounted on a wrist portion located close to the free end of a robot arm of an articulated robot in addition to a force sensor in order to transmit electrical signals and supply power, the force sensor and the slip ring are to be individually provided, which undesirably increases the required mounting volume in the wrist portion.

The present invention provides a force sensor that may be suitably mounted on a rotating unit of a robot arm and that is capable of supplying power, detecting external force, and reducing the mounting volume.

Furthermore, the present invention provides a robot arm including the force sensor.

SUMMARY OF THE INVENTION

The present invention provides a force sensor that detects external force. The force sensor includes a sheath, a pressure member configured to be provided on the sheath, a sensor unit configured to detect force applied to the pressure member, and a slip ring unit configured to supply power or transmit signals through a contact between a rotating body and a stationary body. The sensor unit and the slip ring unit are stored in the sheath, and power is supplied or signals are transmitted between the slip ring unit and the sensor unit.

Furthermore, the present invention provides a robot arm including a plurality of links and a force sensor that detects external force. The force sensor includes a sheath, a pressure member configured to be provided on the sheath, a sensor unit configured to detect force applied to the pressure member, and a slip ring unit configured to supply power or transmit signals through a contact between a rotating body and a stationary body. The sensor unit and the slip ring unit are stored in the sheath, and power is supplied or signals are transmitted between the slip ring unit and the sensor unit.

Further features of the present invention will become apparent from the following description of exemplary embodiments with reference to the attached drawings.

BRIEF DESCRIPTION OF THE DRAWINGS

FIGS. 3A and 3B are electric function block diagrams illustrating the circuit configuration of the force sensor in the present invention.

DESCRIPTION OF THE EMBODIMENTS

The present invention will be described hereinafter with reference to the drawings.

Figure 1A:
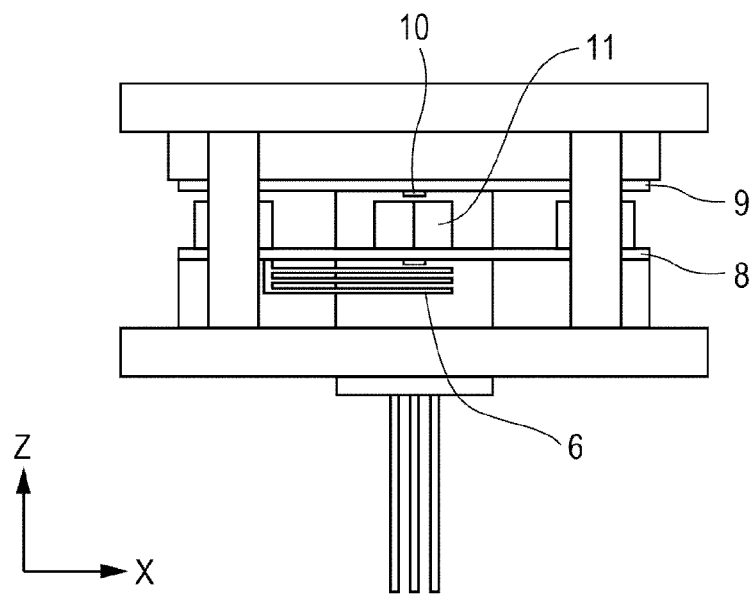
FIGS. 1A and 1B are a cross-sectional view and an exploded perspective view, respectively, of a force sensor in the present invention.
Figure 1B:
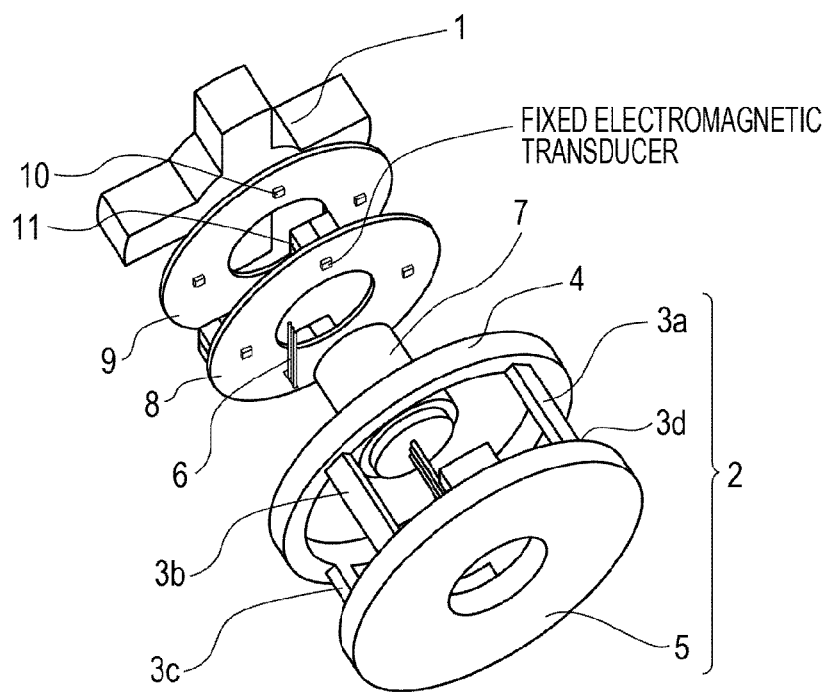

FIGS. 1A and 1B are a cross-sectional view and an exploded perspective view, respectively, of a force sensor in the present invention.

One of sensor units provided in the force sensor in the present invention will be described.

A pressure member 1 composed of a metal such as stainless steel is configured to be mounted on a sheath 2 including a top surface unit 4, a bottom surface unit 5, and four pillars (3a, 3b, 3c, and 3d) connecting the top surface unit 4 and the bottom surface unit 5. The pressure member 1 is illustrated as a cross member in FIG. 1B, the shape of the pressure member 1 is not particularly limited insofar as the pressure member 1 may be mounted on the sheath 2 and has enough rigidity so that the pressure member 1 is not damaged when external force is applied.

As with the pressure member 1, the top surface unit 4, the bottom surface unit 5, and the pillars (3a, 3b, 3c, and 3d) are composed of metals. The pillars (3a, 3b, 3c, and 3d) connect the top surface unit 4 and the bottom surface unit 5 to each other at positions corresponding to the vertices of a square.

For example, notches may be provided in the top surface unit 4 of the sheath 2, and projections corresponding to the notches may be provided on the pressure member 1, so that the top surface unit 4 and the pressure member 1 are fitted together. In FIGS. 1A and 1B, a lower substrate 8 and an upper substrate 9 are provided inside the sheath 2. Magnetic flux generating sources 11 are provided on the lower substrate 8, and magnetoelectric transducers 10 are provided on the upper substrate 9. In the configuration illustrated in FIGS. 1A and 1B, the magnetoelectric transducers 10 are arranged on the upper substrate 9 at substantially the same intervals, and the magnetic flux generating sources 11 corresponding to the magnetoelectric transducers 10 are arranged on the lower substrate 8. In the following description, terms "upper" substrate and "lower" substrate will be used for convenience of description, but there are no particular technical limitations.

Fixed magnetoelectric transducers, whose positions are fixed relative to the positions of the magnetic flux generating sources 11, are provided immediately below the magnetic flux generating sources 11. The fixed magnetoelectric transducers have a configuration that enables continuous monitoring of changes in the magnetic force of the magnetic flux generating sources 11. When permanent magnets are used as the magnetic flux generating sources 11, the strength of magnetic fields generated by the magnetic flux generating sources 11 can decrease due to an increase in temperature caused by heat generated by current flowing through a cable and the like. By sensing this variation in the magnetic fields using the fixed magnetoelectric transducers, the variation may be used as a correction coefficient in detection of external force, which will be described later.

Alternatively, the magnetic flux generating sources 11 may be provided on the upper substrate 9, and the magnetoelectric transducers 10 may be provided on the lower substrate 8. The upper substrate 9 and the lower substrate 8 are arranged inside the sheath 2, and the magnetic flux generating sources 11 and the magnetoelectric transducers 10 provided on these substrates are arranged at certain intervals, so that the magnetic flux generating sources 11 and the magnetoelectric transducers 10 may relatively change their respective positions. The upper substrate 9 is fixed relative to the pressure member 1 or the sheath 2, and the lower substrate 8 is fixed relative to the bottom surface unit 5.

By arranging the components as described above, the positions of the magnetoelectric transducers 10 provided on the upper substrate 9 may change relative to the positions of the magnetic flux generating sources 11 provided on the lower substrate 8 when external force is applied to the pressure member 1. When force mainly having a component in an X direction illustrated in FIG. 1A is applied to the top surface unit 4, the pillars (3a, 3b, 3c, and 3d) of the sheath 2 slightly tilt in the X direction relative to the bottom surface unit 5, and the positions of the upper substrate 9 and the positions of the lower substrate 8 change relative to each other. In addition, when force in a Y direction, which is a depth direction of FIG. 1A but not illustrated in FIG. 1A, is applied to the top surface unit 4, the pillars (3a, 3b, 3c, and 3d) tilt in the Y direction relative to the bottom surface unit 5.

On the other hand, when force in a negative direction of a Z direction is applied to the top surface unit 4, the pillars (3a, 3b, 3c, and 3d) elastically deform and are slightly compressed in the Z direction. As a result, the positions of the upper substrate 9 and the positions of the lower substrate 8 change relative to each other in a direction in which the distance between the top surface unit 4 and the bottom surface unit 5 decreases.

By using the above-described configuration, the magnitude of the magnetic flux flowing to the magnetoelectric transducers 10 changes in accordance with a change in the distance between the magnetic flux generating sources 11 and the magnetoelectric transducers 10 caused by external force applied to the pressure member 1, and accordingly the outputs of the magnetoelectric transducers 10 change in accordance with the change in the magnitude of the magnetic flux. By detecting the changes in the outputs of the magnetoelectric transducers 10, the magnitude of the external force may be detected.

As indicated by the following expressions 1 and 2, output voltages V of the magnetoelectric transducers 10 that change in accordance with magnetic flux density B of the magnetic flux flowing to the magnetoelectric transducers 10 are detected, and external force F is calculated using the output voltages V. If proportionality constants are denoted by $\alpha$ and $\beta$, the following expressions are obtained.

$$V = \alpha B \qquad \text{Expression 1}$$

$$F = \beta V \qquad \text{Expression 2}$$

Next, a slip ring unit provided for the force sensor in the present invention will be described. Wiring and the like are provided on the upper substrate 9 and the lower substrate 8 in practice, but description thereof is partly omitted for the sake of simplification. The slip ring unit includes rings 7, which are rotating bodies, and a brush 6, which is a stationary body. Although the rings 7 are referred to as rotating bodies and the brush 6 is referred to as a stationary body herein, either component may be referred to as a rotating body. The same holds true for a housing in a rotary connector and a shaft capable of rotating relative to the housing.

Figure 7:
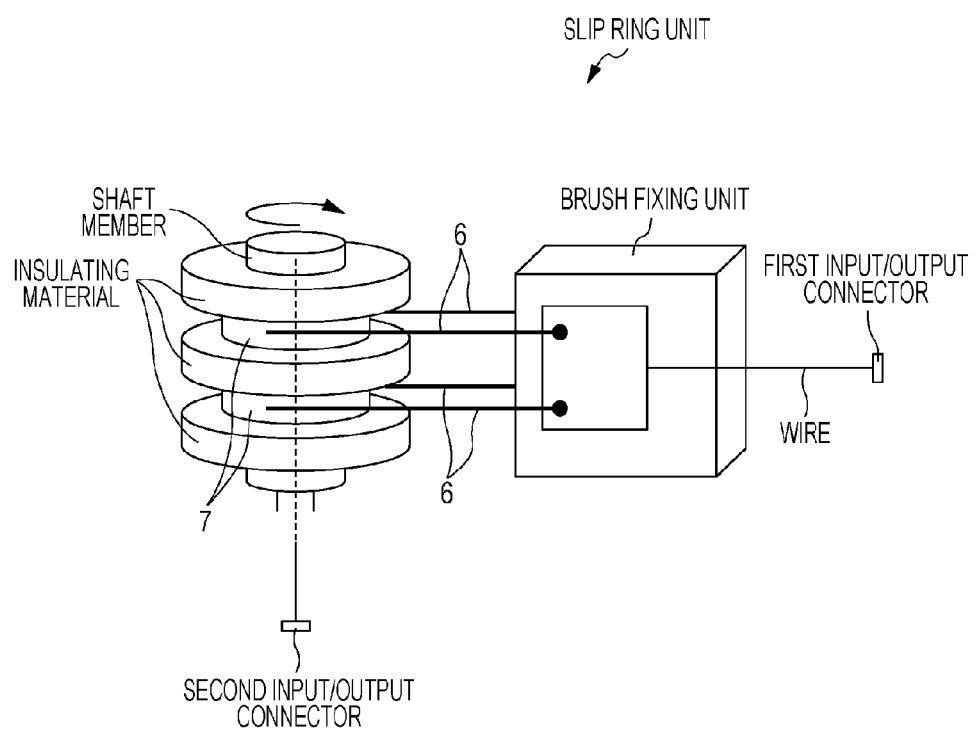
FIG. 7 is a diagram illustrating a slip ring unit.

As the rings 7, a multilayer component obtained by alternately stacking tubular metal members capable of conducting electricity and tubular insulating materials around a shaft member is used. FIG. 7 schematically illustrates the configuration of the slip ring unit. As illustrated in FIG. 7, a multilayer component obtained by alternately stacking tubular metal members capable of conducting electricity, which are the rings 7, and tubular insulating materials around a shaft member is used. The brush 6 is fixed to a brush fixing unit and arranged in such a way as to come into contact with the rings 7. The brush fixing unit is fixed to the lower substrate 8.

The brush 6 is connected to a first input/output connector through a wire included in the brush fixing unit. In addition, a wire electrically connected to the rings 7 is provided for the shaft member and connected to a second input/output connector.

The tubular metal members, which are the rings 7, and the brush 6 come into contact with each other to be electrically connected to each other through contacts, and, as a result, power is supplied and signals are transmitted.

The brush 6 may be provided on the lower substrate 8 through the brush fixing unit, or may be directly provided on the lower substrate 8. In addition, the brush 6 is connected to the wire, and power is supplied and signals are transmitted to the upper substrate 9 and the lower substrate 8 through the wire. Although a configuration in which a connector is provided at an end of the wire connected to the brush 6 as the first input/output connector is illustrated in FIG. 7, the wire connected to the brush 6 may be provided integrally with the wire provided for the lower substrate 8 for supplying power or transmitting signals without providing the first input/output connector. In addition, an external output connector connected to an external cable arranged outside the force sensor may be further provided, and power may be supplied or signals may be transmitted to devices other than the sensor units.

The rings 7 are supported in such a way as to be able to rotate relative to the sheath 2 of the force sensor. In FIG. 1B, an opening is provided in the bottom surface unit 5, and the shaft member of the rings 7 is stored in the opening in such a way as to be able to rotate.

Figure 2:
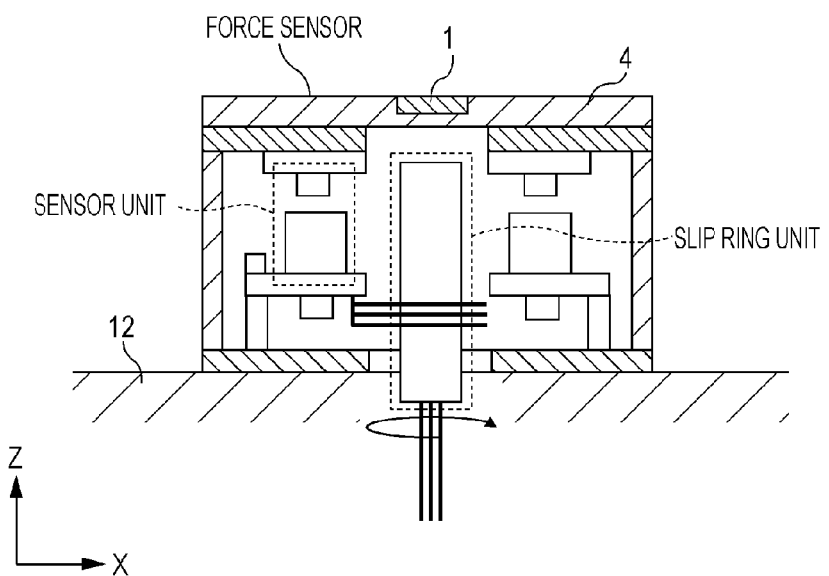
FIG. 2 is a schematic cross-sectional view of the force sensor in the present invention.

As illustrated in FIG. 1B, the upper substrate 9 provided with an opening and the lower substrate 8 provided with an opening may be adopted, and a configuration in which the rings 7 are held in such a way as to be able to relatively rotate may be used. FIG. 2 illustrates a simplified cross-sectional view of the force sensor in the present invention. In the force sensor in the present invention, the cross pressure member 1 is fitted into the notches provided in the top surface unit 4. In FIG. 2, a part of the cross pressure member 1 is held by the top surface unit 4 in the depth direction of FIG. 2 like a beam. The slip ring unit, which includes the brush 6 mounted inside the force sensor and the rings 7 that rotate relative to the brush 6 while being in contact with the brush 6, is provided inside the sheath 2. The force sensor is mounted on a base 12 (for example, a free end of an industrial robot). The shaft of the slip ring unit inserted into the sheath 2 of the force sensor may rotate relative to the sheath 2 of the force sensor, and therefore may rotate relative to the base 12 after the force sensor is mounted on the base 12.

Accordingly, for example, by providing the force sensor in the present invention for a rotor such as a joint portion between two links of an articulated robot, detection of external force and supply of power or transmission of signals to the rotor may be achieved in a compact manner only by the force sensor in the present invention.

As each sensor unit, one of various types of force sensor such as a strain gauge type, a capacitive type, or a magnetic type may be used in accordance with the demands of a user.

When a force sensor of a magnetic type has been selected, permanent magnets or electromagnets may be used as the magnetic flux generating sources 11. The magnetic flux generating sources 11 may be permanent magnets typified by a Nd—Fe—B magnet, a Sm—Co magnet, a Sm—Fe—N magnet, and a ferrite magnet, or may be electromagnets that generate magnetic force by winding coils on magnetic bodies and supplying power. The magnetoelectric transducers 10 are selected from Hall elements, magnetoresistive (MR) elements, magnetoimpedance elements, fluxgate elements, and wound coils.

Thus, the force sensor in the present invention includes both the sensor units and the slip ring unit inside the sheath thereof.

Next, the circuit configuration of the force sensor in the present invention will be described with reference to an electric function block diagram illustrated in FIG. 3A. In the force sensor in the present invention, power supplied from a power supply and signals input from an arithmetic unit, which is not illustrated, are transmitted through the slip ring unit, which is a rotating unit, as external inputs. Either the supplied power as an input from the power supply or the signals transmitted from the arithmetic unit is/are supplied to the external output connector and output to the outside of the force sensor, and the other is supplied to a detection element unit, an arithmetic unit, and a substrate connector provided on the lower substrate 8 through wires. The lower substrate 8 and the upper substrate 9 are electrically connected to each other through substrate connectors, and power is supplied and signals are transmitted. Either a first detection element unit provided on the lower substrate 8 or a second detection element unit provided on the upper substrate 9 is magnetic flux generating sources 11, and the other is the magnetoelectric transducers 10. Even when the magnetic flux generating sources 11 and the magnetoelectric transducers 10 are reversely arranged, there is no significant difference in detecting external force, insofar as the two are arranged in such a way as to be able to move relative to each other. The arithmetic unit need not necessarily be provided on the lower substrate 8.

Figure 3B:
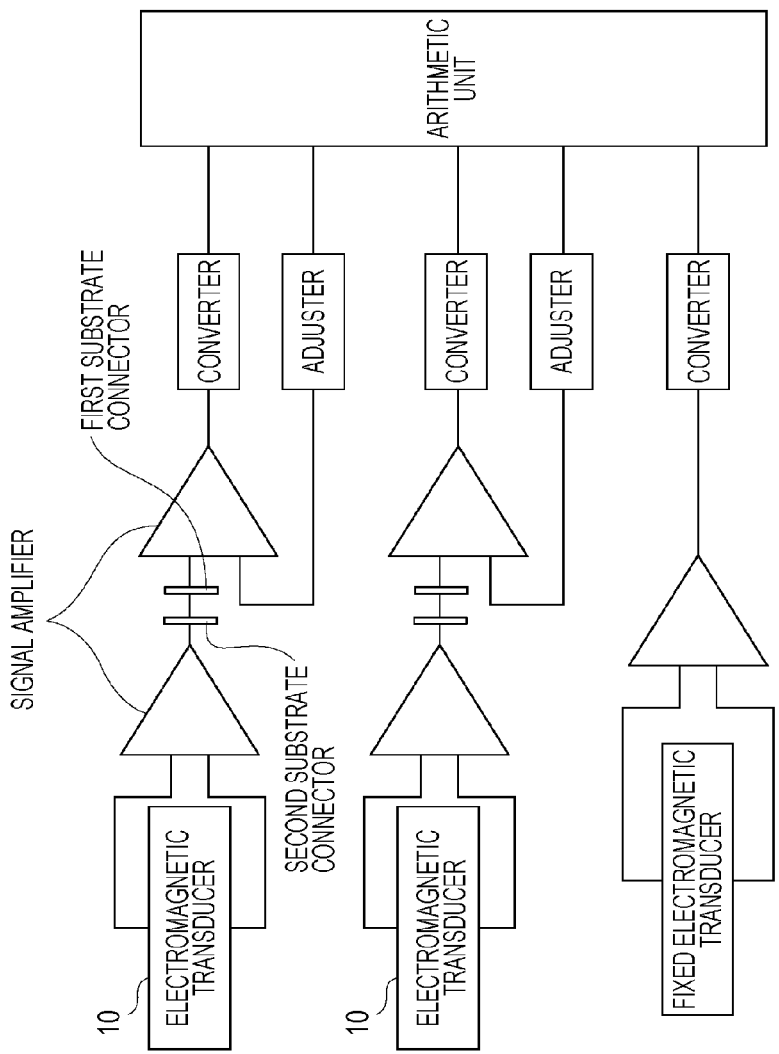

FIG. 3B is a circuit diagram illustrating the above-mentioned first and second detection element unit.

Transmission of signals in the force sensor in the present invention will be described with reference to FIG. 3B.

A plurality of magnetoelectric transducers 10 are provided on the first or second detection element unit. Furthermore, signal amplification units for amplifying signals of the plurality of magnetoelectric transducers 10 are included and connected to the corresponding magnetoelectric transducers 10. In addition, signal converters such as analog-to-digital (AD) converters for enabling the arithmetic unit to receive the output signals of the magnetoelectric transducers 10 are included and connected to the corresponding signals amplification units. Furthermore, adjusters that feed results of calculation performed by the arithmetic unit back to the outputs of the magnetoelectric transducers 10 are included. The adjusters have a configuration that enables output of signals for performing a correction process before the outputs of the magnetoelectric transducers 10 are input to the converters.

The output voltages of the fixed magnetoelectric transducers might change when the magnetic fields generated by the magnetic flux generating sources 11 have changed due to changes in temperature or changes over time. The correction process is performed using detected values of the changes in the generated magnetic fields.

For example, the force sensor in the present invention may be provided at an end of a robot arm, and an end effector such as a robot hand may be provided for the force sensor such that a "wrist portion" between the robot arm and the robot hand is able to rotate. In such a configuration, the force sensor may receive power from a power supply included in the robot arm and transmit and receive signals to and from an arithmetic unit included in the robot arm. Accordingly, power may be supplied to the end effector and signals may be transmitted and received to and from the end effector as an additional external output of the force sensor.

First Embodiment

Figure 4:
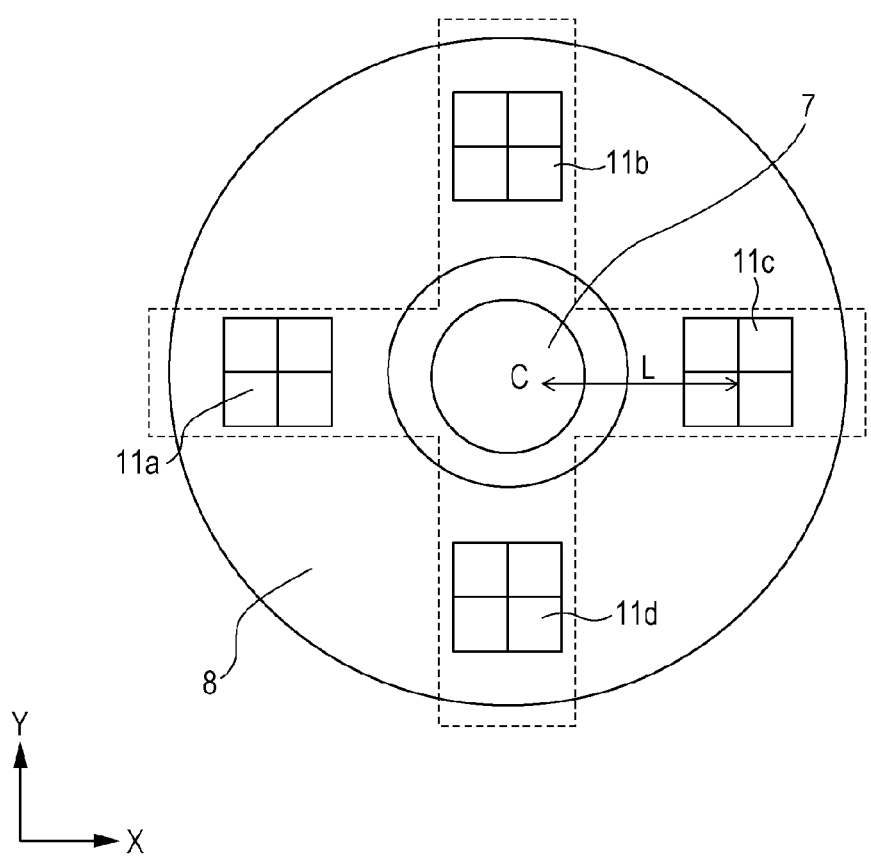
FIG. 4 is a diagram illustrating a force sensor according to a first embodiment of the present invention.

A specific embodiment of the present invention will be described hereinafter with reference to FIG. 4. FIG. 4 is a diagram illustrating a lower substrate 8 provided for a force sensor according to a first embodiment of the present invention viewed from above in the Z direction. A cross indicated by broken lines represents the projection of the shape of a pressure member 1 arranged in a closer direction of FIG. 4 (that is, above in the Z direction).

An opening is provided in the center of the lower substrate 8, and rings 7 are stored in the opening. In addition, magnetic flux generating sources (11a, 11b, 11c, and 11d) are provided in such a way as to surround the opening, and magnetoelectric transducers (10a, 10b, 10c, and 10d), which are not illustrated in FIG. 4, are provided on an upper substrate 9 at positions corresponding to the magnetic flux generating sources (11a, 11b, 11c, and 11d), respectively. A plurality of sensor units each including one of the magnetic flux generating sources 11 and one of the magnetoelectric transducers 10 are provided in such a way as to surround the rings 7.

As the magnetic flux generating sources 11, permanent magnets each having a size of 5 mm×5 mm are provided in an XY plane as illustrated in FIG. 4. In addition, the magnetoelectric transducers 10, which are not illustrated in FIG. 4, are arranged at positions 1 mm away from the provided magnetic flux generating sources 11 in a Z-axis direction.

If the output voltages of the magnetoelectric transducers 10 are denoted by $V_a$, $V_b$, $V_c$, and $V_d$, weight Fz in the Z direction caused by external force F, moment Mx along an X-axis, and moment My along a Y-axis may be expressed by the following expressions 3, 4, and 5, respectively, by denoting proportionality constants by $K_1$, $K_2$, and $K_3$. With respect to the proportionality constants $K_1$, $K_2$, and $K_3$, correction coefficients determined in accordance with the outputs of fixed magnetoelectric conversion elements are calculated by an arithmetic unit, and reflected by the outputs of the magnetoelectric transducers 10 as necessary though adjusters.

$$Fz = K_1(V_a + V_b + V_c + V_d) \qquad \text{Expression 3}$$

$$Mx = K_2(V_d - V_b) \qquad \text{Expression 4}$$

$$My = K_3(V_c - V_a) \qquad \text{Expression 5}$$

As illustrated in FIG. 4, by using a configuration in which the sensor units surround the rings 7, the sensor units including the magnetic flux generating sources 11 and the magnetoelectric transducers 10, which are not illustrated, may be arranged such that a distance L from an intersection C of beams configuring the pressure member 1 becomes large. As the distance L becomes larger, changes in the positions of the magnetoelectric transducers 10 relative to the pressure member 1 caused by the force F applied to the force sensor become larger, and accordingly changes in the positions of the magnetoelectric transducers 10 relative to the positions of the magnetic flux generating sources 11 become larger. Therefore, outputs V in response to the same force F applied to the force sensor become larger, thereby improving the sensitivity of the sensor during detection of force or moment. As illustrated in FIG. 4, when the pressure member 1 includes two intersecting beams whose intersection is arranged in substantially the same line as the rotation axis of the rings 7 and a plurality of sensor units are provided axially symmetrically to the rotation axis of the rings 7, the effect further improves. By using such a configuration, a force sensor that may be suitably mounted on a rotating unit, that is able to supply power and detect external force, and that has a small mounting volume when mounted may be provided.

Second Embodiment

In the present embodiment, a brush 6 may be provided on a front surface of a lower substrate 8 on which magnetoelectric transducers 10 or magnetic flux generating sources 11 are provided or a back surface of the lower substrate 8.

The brush 6 is a comb-like member having several to ten conductive metal wires arranged parallel to one another at intervals of about 1 mm, and occupies a length of several to about 10 mm when mounted. Therefore, when the brush 6 is to be mounted on the same surface of the lower substrate 8 as sensor units, the distance between the magnetoelectric transducers 10 and the magnetic flux generating sources 11 may need to be large in order to secure the above mounting length. On the other hand, when the brush 6 is to be mounted on the surface of the lower substrate 8 opposite the surface on which the sensor units are provided, the distance between the magnetoelectric transducers 10 and the magnetic flux generating sources 11 may be desirably small compared to the above-described case.

Figure 5A:
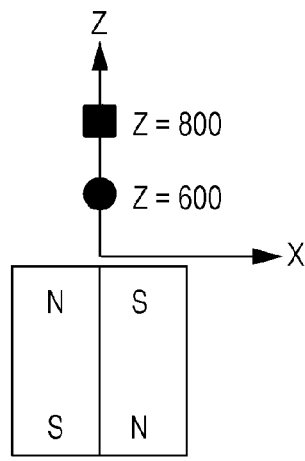
FIGS. 5A to 5C are diagrams illustrating a force sensor according to a second embodiment of the present invention.

FIG. 5A is a graph illustrating the behavior of the magnetic flux density B of magnetic flux flowing to the magnetoelectric transducers 10 at a time when the positions of the magnetic flux generating sources 11 and the magnetoelectric transducers 10 relatively change in the X-axis direction due to the external force F applied to the force sensor.

Figure 5B:
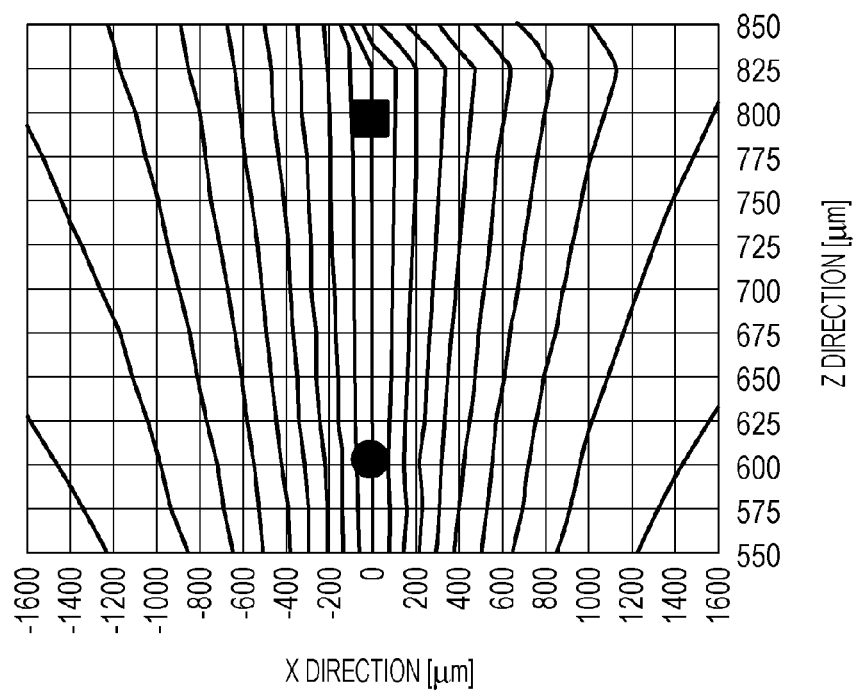
Figure 5C:
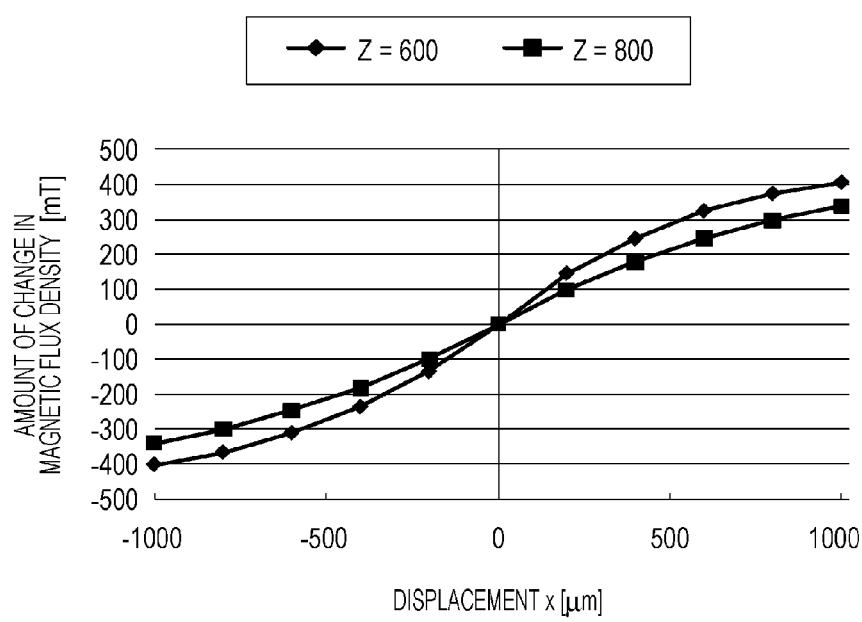

As a magnetic flux generating source 11, two prism-shaped magnets having the same size attached to each other whose directions of magnetic poles are opposite to each other are used. By using such a magnetic flux generating source 11, as illustrated in FIG. 5B, a magnetic field having a steep gradient in the X-axis direction with respect to the contact surface of the two magnets may be generated. FIG. 5C illustrates changes in the magnetic flux density at a time when a magnetoelectric transducer 10 is located 600 μm away from a pole face in the Z-axis direction and at a time when the magnetoelectric transducer 10 is located 800 μm away from the pole face in the Z-axis direction while taking the Z-axis along the contact surface of the two magnets and the X-axis along a normal of the contact surface of the magnets. In FIG. 5C, in which the magnetoelectric transducer 10 is located 600 μm away from the pole face and 800 μm away from the pole face, changes in the magnetic flux density when the position of the magnetoelectric transducer 10 has changed in the X-axis direction due to the external force F are illustrated.

As can be seen from FIG. 5C, the amount of change in the magnetic flux density [mT] is large relative to a displacement x [μm] in the case of a line that represents z=600, that is, when the magnetoelectric transducer 10 is located closer to the magnets. As indicated by the above-described expressions 1 and 2, since the output voltage becomes larger relative to the same displacement when the magnetoelectric transducer 10 is located closer to the magnets, detection of force may be performed more sensitively.

Therefore, by providing the brush 6 on the surface of the lower substrate 8 opposite the surface on which the magnetic flux generating sources 11 or the magnetoelectric transducers 10 are provided, a configuration in which the magnetoelectric transducers 10 and the magnetic flux generating sources 11 become closer to each other may be obtained, thereby improving the sensitivity of the detection of force, which is advantageous.

In the case of a capacitive sensor, capacitance C is expressed as C=ϵ×(S/D), where ϵ denotes permittivity, S denotes the area of electrodes of the sensor, and D denotes the distance. That is, a graph in which the capacitance C is inversely proportional to the distance D is obtained. Therefore, in the case of the capacitive sensor, too, changes in the capacitance C become larger in a configuration in which the distance between the electrodes of the sensor is closer, and accordingly the sensitivity of the detection of force improves, which is advantageous.

Third Embodiment

Figure 6:
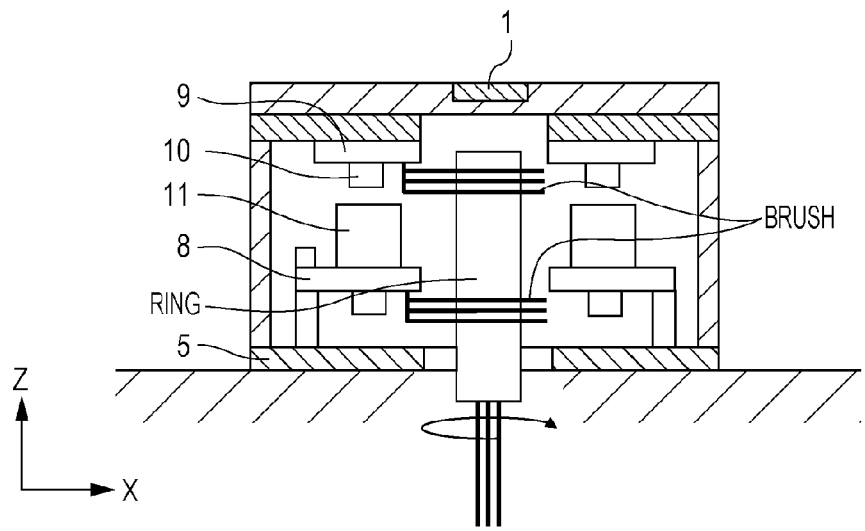
FIG. 6 is a diagram illustrating a force sensor according to a third embodiment of the present invention.
Figure 6:
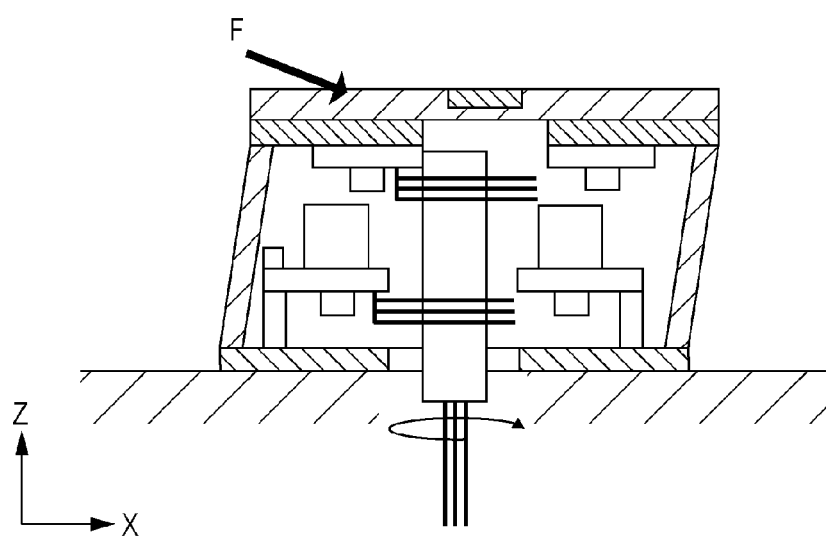

FIG. 6 is a diagram illustrating a force sensor in which brushes 6 are provided on an upper substrate 9 and a lower substrate 8 and in contact with rings 7. The lower substrate 8 is fixed relative to a bottom surface unit 5 of a sheath 2. The same components as those described above are given the same reference numerals, and description thereof is omitted. When the external force F is applied to the force sensor having such a configuration and the relative positions of magnetoelectric transducers 10 and magnetic flux generating sources 11 change, the position of the brush 6 provided on the upper substrate 9 changes relative to the positions of the rings 7, and accordingly contact force between the brush 6 and the rings 7 changes, which may adversely affect transmission of signals and supply of power. On the other hand, with respect to the brush 6 provided on the lower substrate 8, whose position is fixed relative to the bottom surface unit 5, there is no or little change in the position at which the brush 6 and the rings 7 are in contact with each other before and after the application of the external force F. The position of the lower substrate 8 as a support member is substantially fixed relative to the position of the bottom surface unit 5 of the sheath 2.

Therefore, by providing the brush 6 on the lower substrate 8, which is a support member whose position is fixed relative to the bottom surface unit 5, power may be supplied and signals may be transmitted in a stable manner.

Fourth Embodiment

When the contact force between the brush 6 and the rings 7 is too large, the brush 6 and the rings 7 might be prematurely worn out and accordingly durability decreases, and when the contact force between the brush 6 and the rings 7 is too small, electrical signals might not be stably transmitted. That is, there is an appropriate positional relationship between the brush 6 and the rings 7. Therefore, it is desirable to be able to adjust the brush 6 and the rings 7 to desired positions during assembly.

On the other hand, in a force sensor of a magnetic type, the positional relationship between magnetoelectric transducers 10 provided on a lower substrate 8 and magnetic flux generating sources 11 affects the characteristic of the sensor. In the configuration illustrated in FIGS. 1A, 1B, and 2 in which the brush 6 is provided on the lower substrate 8, the positions of the magnetoelectric transducers 10 and the brush 6 change when the position of the lower substrate 8 is adjusted, and therefore it might be difficult to adjust the magnetoelectric transducers 10 and the brush 6 to desired positions.

Figure 8:
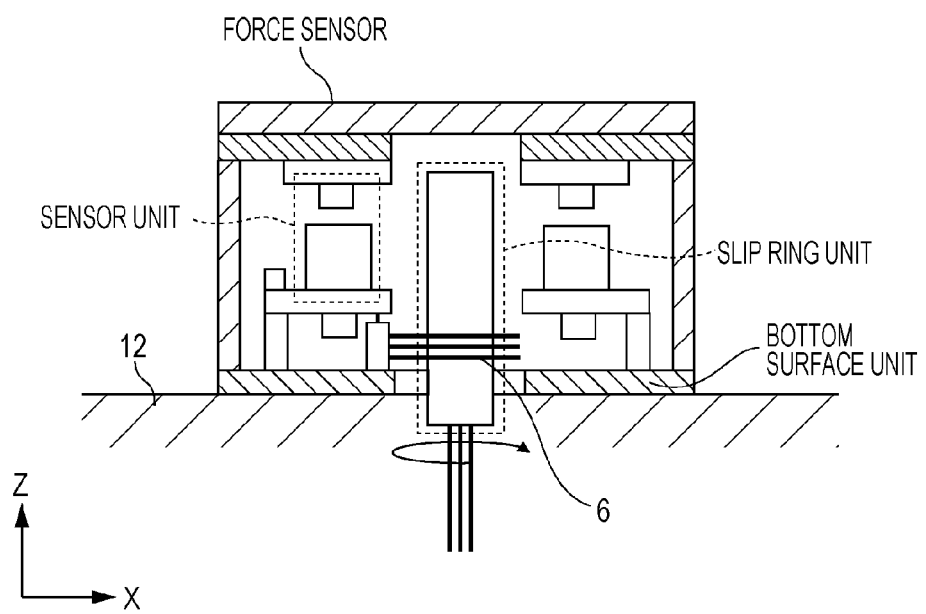
FIG. 8 is a diagram illustrating a force sensor according to a fourth embodiment of the present invention.

FIG. 8 illustrates a configuration in which the brush 6 is directly fixed to the bottom surface unit through the brush fixing unit. In this configuration, the position of the brush 6 may be adjusted independently of the rings 7 and the positions of the magnetoelectric transducers 10 may be adjusted independently of the magnetic flux generating sources 11. In addition, by connecting the brush 6 and the lower substrate 8 using a cable, power may be supplied and signals may be transmitted to the force sensor.

Fifth Embodiment

Figure 9:
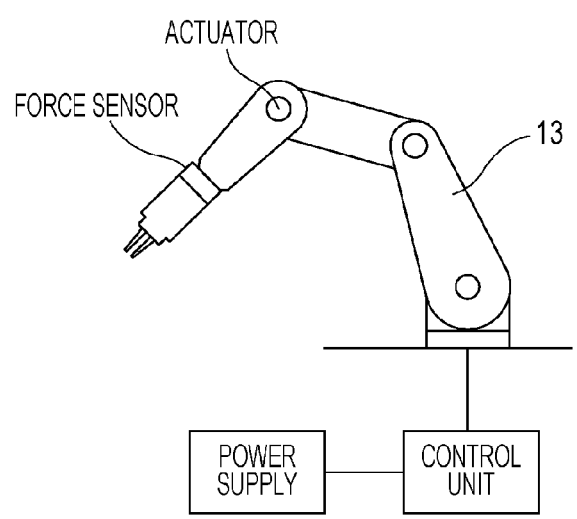
FIG. 9 is a diagram illustrating a robot arm on which the force sensor in the present invention is mounted.

FIG. 9 illustrates a robot arm on which the force sensor in the present invention is mounted. A robot arm 13, the force sensor, and a robot hand 14 are connected in series with one another. Furthermore, the robot hand 14 is arranged in such a way as to be able to rotate relative to the robot arm 13, and the force sensor is provided at a position corresponding to a "wrist" of the robot arm 13.

Power supplied from a power supply and signals transmitted from a control unit reach the force sensor in the present invention through a signal line and a power line, which are not illustrated, provided for the robot arm 13, and then reach the robot hand 14 through the force sensor. Since the slip ring unit and the sensor units are integrally formed in the force sensor in the present invention, the force sensor in the present invention may be provided close to a free end of the robot arm 13, at which the mounting volume is significantly limited.

A robot arm including the force sensor in the present invention may be suitably used for an articulated robot, and an articulated robot including the force sensor in the present invention may be suitably used for manufacture.

The present invention may provide a force sensor capable of smoothly supplying power and detecting external force, as well as reducing the mounting volume.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147149 filed Jun. 29, 2012, which is hereby incorporated by reference herein in its entirety.

What is claimed is:

1. A force sensor that detects external force, the force sensor comprising:
a sheath;
a pressure member configured to be provided on the sheath;
a sensor unit configured to detect force applied to the pressure member;
a slip ring unit configured to supply power or transmit signals through a contact between a rotating body and a stationary body; and
a substrate unit configured to perform processing of electrical signals generated in the sensor unit,
wherein the sensor unit, the slip ring unit and the substrate unit are stored in the sheath, and power is supplied or signals are transmitted between the slip ring unit and the sensor unit.

2. The force sensor according to claim 1,
wherein the rotating body is a brush, and the stationary body is a ring.

3. The force sensor according to claim 2,
wherein there are a plurality of sensor units, and the plurality of sensor units are provided on a support member in such a way as to surround the ring.

4. The force sensor according to claim 2,
wherein the pressure member has a structure in which two beams intersect, an intersection between the two beams and a rotation axis of the ring are arranged in substantially the same line, and a plurality of sensor units are provided axially symmetrically to the rotation axis of the ring.

5. The force sensor according to claim 2,
wherein the sensor unit is provided on a surface of the substrate unit, and
wherein the brush is provided on a surface, of the substrate unit, opposite the surface on which the sensor unit is provided.

6. The force sensor according to claim 1,
wherein the sheath includes a bottom surface unit, a top surface unit on which the pressure member is provided, and plural pillars that supports the bottom surface unit and the top surface unit, and
wherein, within an interior of the sheath, the substrate unit is provided as a support member in a manner such that a position of the substrate unit is substantially fixed relative to a position of the bottom surface unit.

7. The force sensor according to claim 6,
wherein the brush is provided on the bottom surface unit.

8. The force sensor according to claim 6,
wherein the brush is provided on the support member on which the sensor unit is provided.

9. The force sensor according to claim 6,
wherein the sensor unit includes a magnetic flux generating source and a magnetoelectric transducer, and
wherein either the magnetic flux generating source or the magnetoelectric transducer is supported by the pressure member and the other is provided on the support member, and the magnetic flux generating source and the magnetoelectric transducer are arranged in such a way as to move relative to each other and external force is detected on the basis of an output of the magnetoelectric transducer.

10. The force sensor according to claim 1, further comprising:
an external output connector.

11. A robot arm configured by connecting a plurality of links, the robot arm comprising:
the force sensor according to claim 1.

* * * * *